(12) United States Patent
Vancoille

(10) Patent No.: US 7,782,550 B2
(45) Date of Patent: Aug. 24, 2010

(54) LENS STRUCTURE, OPTICAL TRANSMITTER, AND METHOD FOR PRODUCING SAME

(75) Inventor: Eric Vancoille, Singapore (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/255,505

(22) Filed: Oct. 21, 2008

(65) Prior Publication Data

US 2009/0040628 A1 Feb. 12, 2009

Related U.S. Application Data

(62) Division of application No. 10/979,687, filed on Nov. 1, 2004, now Pat. No. 7,457,343.

(51) Int. Cl.
*G02B 17/00* (2006.01)

(52) U.S. Cl. .............................. 359/726; 359/727

(58) Field of Classification Search .............. 359/726, 359/709–712, 727, 728
See application file for complete search history.

(56) References Cited

U.S. PATENT DOCUMENTS

| | | | |
|---|---|---|---|
| 2,759,393 A | * | 8/1956 | McLeod ..................... 356/138 |
| 3,744,740 A | | 7/1973 | Godin et al. |
| 3,972,599 A | | 8/1976 | Engel et al. |
| 4,623,776 A | * | 11/1986 | Buchroeder et al. .... 219/121.67 |
| 5,173,180 A | | 12/1992 | Stewart et al. |
| 5,173,810 A | | 12/1992 | Yamakawa |
| 5,526,190 A | | 6/1996 | Hubble, III et al. |
| 6,961,489 B2 | | 11/2005 | Cox et al. |
| 7,002,697 B2 | | 2/2006 | Domash et al. |
| 2004/0091218 A1 | | 5/2004 | Haasteren |

OTHER PUBLICATIONS

Ortiz, C G., et al., "Momolithic Intergratin of InGaAs Vertical Cavity Surface Emitting Lasers with Resomamce Enhanced Quantam Well Photodetectors", *Electronics Letters*, vol. 32, No. 13, (Jun. 1996),1205-1207.

* cited by examiner

*Primary Examiner*—Scott J Sugarman

(57) ABSTRACT

In one embodiment, a lens structure has an object surface, an image surface, and an axicon mirror. The axicon mirror is defined by an inner diameter, an outer diameter, and a tilt angle, with the tilt angle being defined by a plane of the axicon mirror and the surface of the axicon mirror. The image surface is positioned within the inner diameter of the axicon mirror. The lens structure may be incorporated into an optical transmitter having a light source and a photodetector. The light source is positioned to transmit light toward the object surface of the lens structure, and the photodetector is positioned to receive light reflected from the axicon mirror. A method for producing lens structures with different optical attenuation properties is also disclosed.

8 Claims, 6 Drawing Sheets

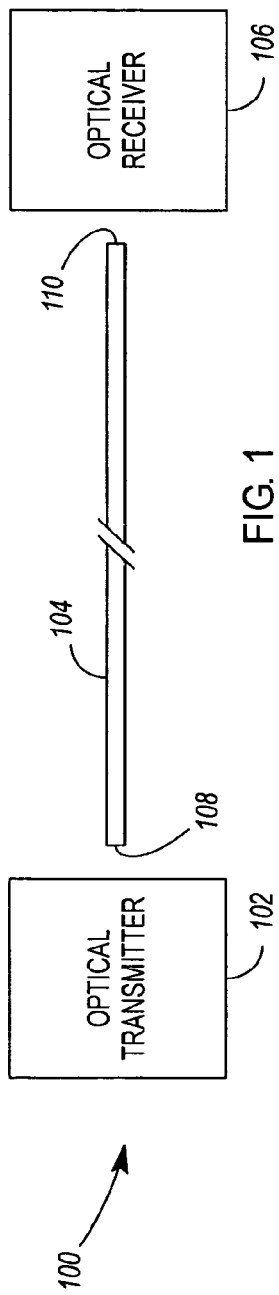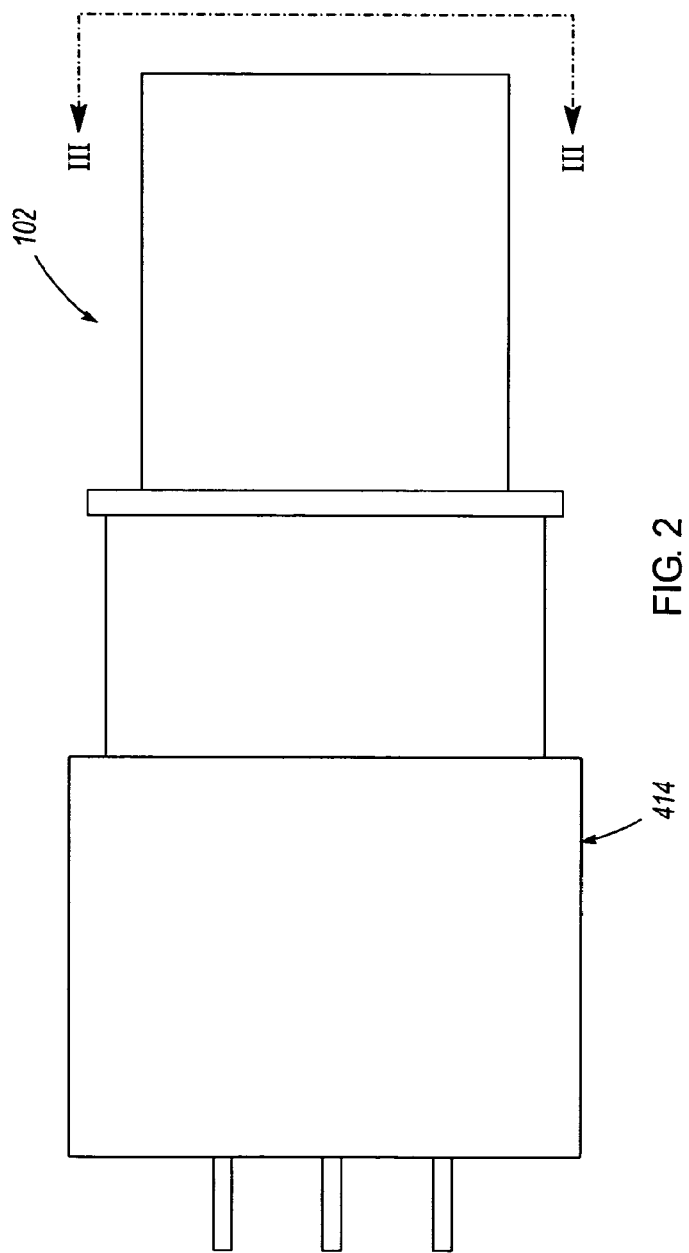

LENS STRUCTURE, OPTICAL TRANSMITTER, AND METHOD FOR PRODUCING SAME

This application is a divisional application of serial number 10/979,687, filed on Nov. 1, 2004, which is hereby incorporated by reference for all that is disclosed.

BACKGROUND

To attenuate the optical signal emitted by a solid-state light source such as a laser diode, various coatings, diffractive optical elements, light-absorbing materials and/or active opto-electronic elements are typically employed.

For example, one common way to provide attenuation of an optical signal is to apply a transmission control coating to a glass element such as a slide or lens. The glass element is then sealed (e.g., via a glass-frit process) onto a metallic header can (e.g., a transistor outline (TO) can) that is welded to a header on which a solid-state light source is mounted. The degree of attenuation provided by the glass element is dependent on its tilt with respect to the plane of the light source and on the type of transmission control coating composition used. A smaller tilt angle provides less attenuation, while a larger tilt angle provides more attenuation. The tilt angle also affects the amount of light that can be reflected back to a photodetector for monitoring the light emitted by the light source. Disadvantages associated with the use of such a glass element include the complexity of determining the required tilt angle for a given attenuation, the required transmission control coating composition when the tilt angle might be subject to variations, the number of parts, and the complexity of assembling the parts.

SUMMARY OF THE INVENTION

In one embodiment, a lens structure comprises an object surface, an image surface, and an axicon mirror. The axicon mirror is defined by an inner diameter, an outer diameter, and a tilt angle, with the tilt angle being defined by a plane of the axicon mirror and the surface of the axicon mirror. The image surface is positioned within the inner diameter of the axicon mirror.

In another embodiment, an optical transmitter comprises a lens structure, a light source, and a photodetector. The lens structure comprises an object surface, an image surface, and an axicon mirror. The axicon mirror is defined by an inner diameter, an outer diameter, and a tilt angle, with the tilt angle being defined by a plane of the axicon mirror and the surface of the axicon mirror. The image surface is positioned within the inner diameter of the axicon mirror. The light source is positioned to transmit light toward the object surface of the lens structure, and the photodetector is positioned to receive light reflected from the axicon mirror.

In yet another embodiment, a method for producing lens structures with different optical attenuation properties comprises injecting a common molding material into each of a plurality of mold cavities. Each mold cavity defines a lens structure having 1) an object surface, 2) an axicon mirror defined by an inner diameter, an outer diameter, and a tilt angle, the tilt angle being defined by a plane of the axicon mirror and the surface of the axicon mirror, and 3) an image surface within the inner diameter of the axicon mirror. Different ones of the mold cavities define different combinations of image surfaces and axicon mirrors, with different axicon mirrors sharing a common outer diameter and tilt angle, but having different inner diameters. After injecting the polymer material into the mold cavities, a molded part is removed from each cavity.

Other embodiments are also disclosed.

BRIEF DESCRIPTION OF THE DRAWINGS

Illustrative and presently preferred embodiments of the invention are illustrated in the drawings, in which:

FIG. 1 illustrates an exemplary optical communication system;

FIGS. 2-5 illustrate an exemplary embodiment of the optical transmitter shown in FIG. 1, with FIG. 2 illustrating an exterior elevation of the transmitter, FIG. 3 illustrating an end-view of the transmitter, FIG. 4 illustrating a cross-section of the transmitter, and FIG. 5 illustrating an exploded view of the lens structure shown in FIG. 4;

DETAILED DESCRIPTION OF AN EMBODIMENT

Figure 3:
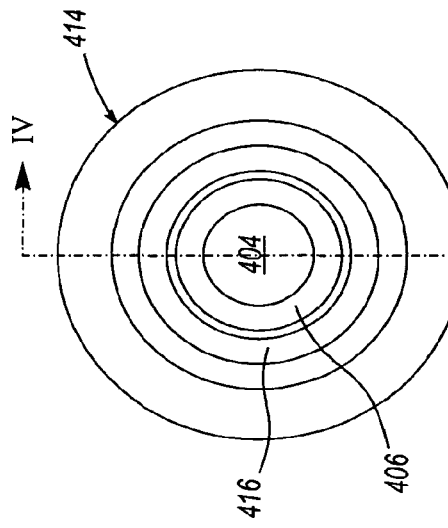

FIG. 1 illustrates an exemplary optical communication system 100 comprising an optical transmitter 102, an optical fiber 104, and an optical receiver 106. The fiber 104 comprises a transmitter end face 108 that is optically coupled to the transmitter 102, and a receiver end face 110 that is optically coupled to the receiver 106. Depending on the application of the communication system 100, the fiber 104 may take the form of a multimode, single-mode or other type of fiber. Depending on the application of the communication system 100, the fiber 104 may take the form of a multimode, single-mode or other type of fiber, such as, but not limited to, a 62.5/125 µm, 50/125 µm, or 100/140 µm multimode fiber, a 9/125 µm single-mode fiber, or a 200 µm HCS (Hard Clad Silica) fiber. By means of the fiber 104, the optical communication system 100 may transmit signals (e.g., data) between the transmitter 102 and the receiver 106.

An exemplary embodiment of the optical transmitter 102 is shown in FIGS. 2-5. The optical transmitter 102 comprises a lens structure 400 (FIG. 4) having an object surface 402, an image surface 404, and an axicon mirror 406. The axicon mirror 406 is defined by an inner diameter (I), an outer diameter (O), and a tilt angle (θ). The tilt angle is defined by a plane 500 of the axicon mirror 406 and the surface of the axicon mirror 406 (see FIG. 5). The image surface 404 is positioned within the inner diameter of the axicon mirror 406. The object and image surfaces 402, 404 may be variously shaped, but are preferably convex.

The optical transmitter 102 further comprises a light source 408 and a photodetector 410. The light source 408 is positioned to transmit light toward the object surface 402 of the lens structure 400, and the photodetector 410 is positioned to receive light reflected from the axicon mirror 406. In one embodiment, the light source 408 and photodetector 410 are mounted on a common substrate, such as a transistor outline (TO) can header 412.

The light source 408 may take various forms, but is preferably a surface-emitting laser diode, such as a vertical cavity surface emitting laser (VCSEL). The light source 408 is chosen and positioned such that its emitted light 502, 504 is projected onto the object surface 402 of the lens structure 400. In one embodiment, the shape of the object surface 402 is chosen so that light 502, 504 incident thereon is collimated (or at least substantially collimated). A first portion of the light 502 passing through the object surface 402 then also passes through the image surface 404 of the lens structure 400, and into the transmitter end face 108 of the optical fiber 104. The shape of the image surface 404 may be chosen so that the light 502 transmitted through the image surface 404 is focused on the transmitter end face 108 of the fiber 104.

A second portion of the light 504 passing through the object surface 404 of the lens structure 400 falls incident on the axicon mirror 406. Preferably, the tilt angle (θ) of the axicon mirror 406 is optimized with respect to the object surface 402 of the lens structure 400, to provide total internal reflection of the light rays 504 that are incident on the axicon mirror 406.

In some cases, the tilt angle of the axicon mirror 406 may also be optimized with respect to the object surface 402 of the lens structure 400 to provide light ray return paths that are asymmetrical to forward light ray paths. In this manner, light 504 reflected by the axicon mirror 406 is not directed toward the light source 408 from which it is emitted, but is rather reflected in a ring 600 about the light source 408 (see FIG. 6).

If the light 502, 504 passing through the object surface 402 of the lens structure 400 is substantially collimated, then the tilt angle of the axicon mirror 406 should be something greater than forty-five degrees (45°).

Figure 6:
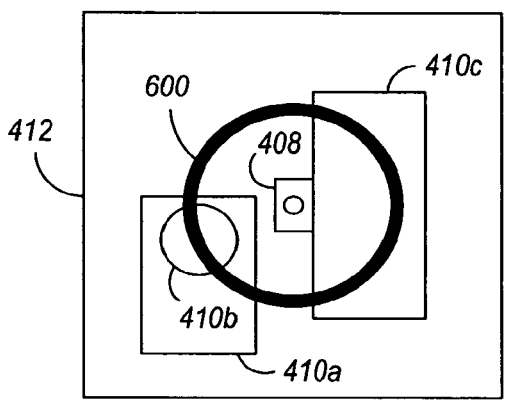
FIG. 6 illustrates the pattern of light reflected about the light source of the optical transmitter shown in FIGS. 2-5.

The photodetector 410 is positioned such that it intersects the ring of light 600 reflected by the axicon mirror 406. In this manner, the photodetector 410 may be used to monitor the intensity of light emitted by the light source 408, and appropriate adjustments may be made to the drive signal(s) of the light source 408 to, for example, regulate the intensity of the light source 408 or protect the light source 408 from damage due to a fault condition. In one embodiment, the photodetector 410 is a positive-intrinsic-negative (PIN) diode. As a result of the axicon mirror 406 reflecting a ring of light 600 (instead of a point light) toward the substrate 412 on which the light source 408 and photodetector 410 are mounted, there is substantial leeway in where the photodetector 410 may be positioned, as well as leeway in the type and size of photodetector 410 used. Three possible locations 410a, 410b, 410c and shapes for the photodetector 410 are shown in FIG. 6.

If the light source 408 is appropriately positioned with respect to the object surface 402 of the lens structure 400, and if the object surface 402 is appropriately shaped, then all (or at least substantially all) of the light 502, 504 emitted by the light source 408 will fall on the image surface 404 or the axicon mirror 406. That portion 502 which falls on the image surface 404 will be focused into an optical fiber 104 to fulfill the primary purpose of the optical transmitter 102, while that portion 504 which falls on the axicon mirror 406 will be reflected toward the photodetector 410 for monitoring purposes. By varying the dimension "A" of the axicon mirror 406 (see axicon mirrors 406, 406a, image surfaces 404, 404a, and dimensions $A_1, A_2$ in FIGS. 7 & 8), the lens structure 400 may provide varying degrees of attenuation. For example, experimentation with an axicon mirror 406 having an outside diameter of 1.60 mm and a tilt angle of forty-six degrees (46°), has shown that a variance of "A" from 0.45-0.95 mm yields the degrees of attenuation shown in FIG. 9.

Because the lens structure 400 can provide optical attenuation without the use of light absorbing materials, the lens structure 400 can theoretically provide optical power conservation approaching 100%, although real-world factors will lead to some percentage of light scattering or diffusing (e.g., maybe 1-5%). However, depending on its precise configuration, the lens structure 400 shown in FIGS. 2-5 can provide substantially better optical power conservation than past lens structures that have relied on light absorbing materials or coatings to attenuate an optical signal.

Figure 10:
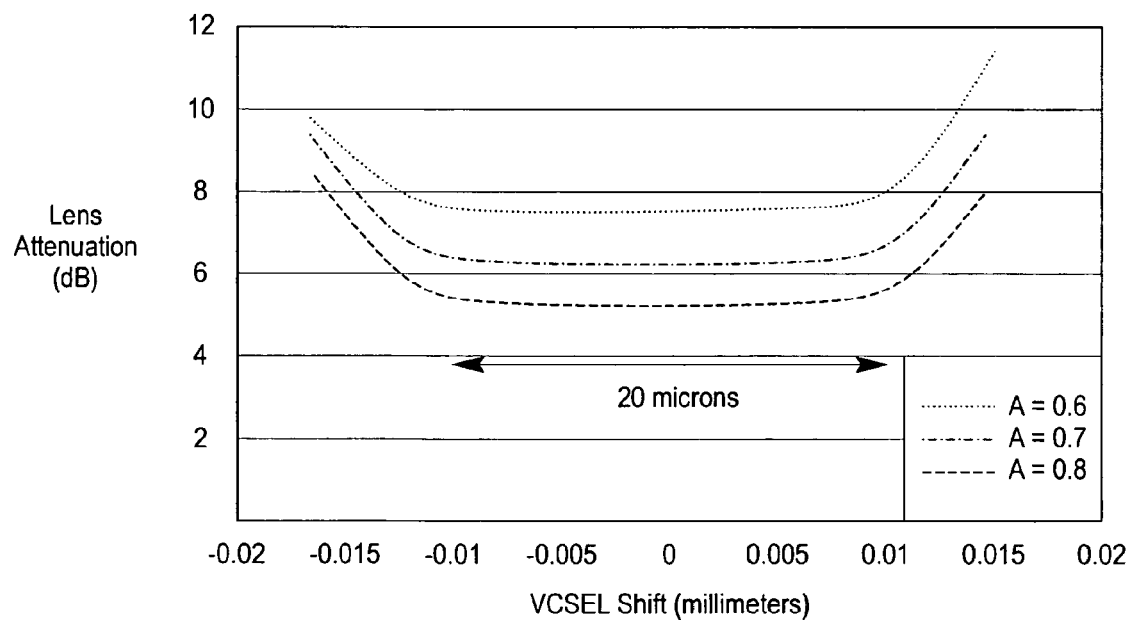
FIG. 10 illustrates how the lens structure shown in FIGS. 2-5 is tolerant to a range of light source placements.
Figure 11:
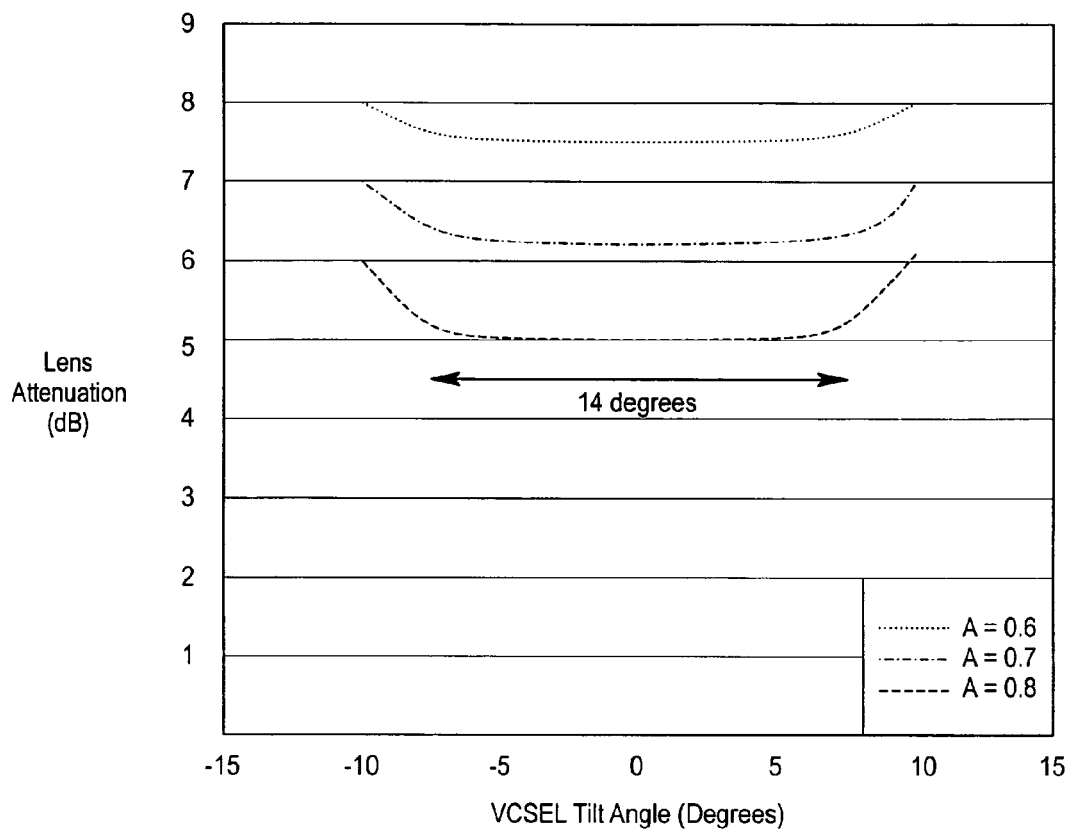
FIG. 11 illustrates how the lens structure shown in FIGS. 2-5 is tolerant to a range of light source tilts.

As shown in FIGS. 10 & 11, the lens structure 400 shown in FIGS. 2-5 is tolerant to a range of light source placements and tilts.

Figure 4:
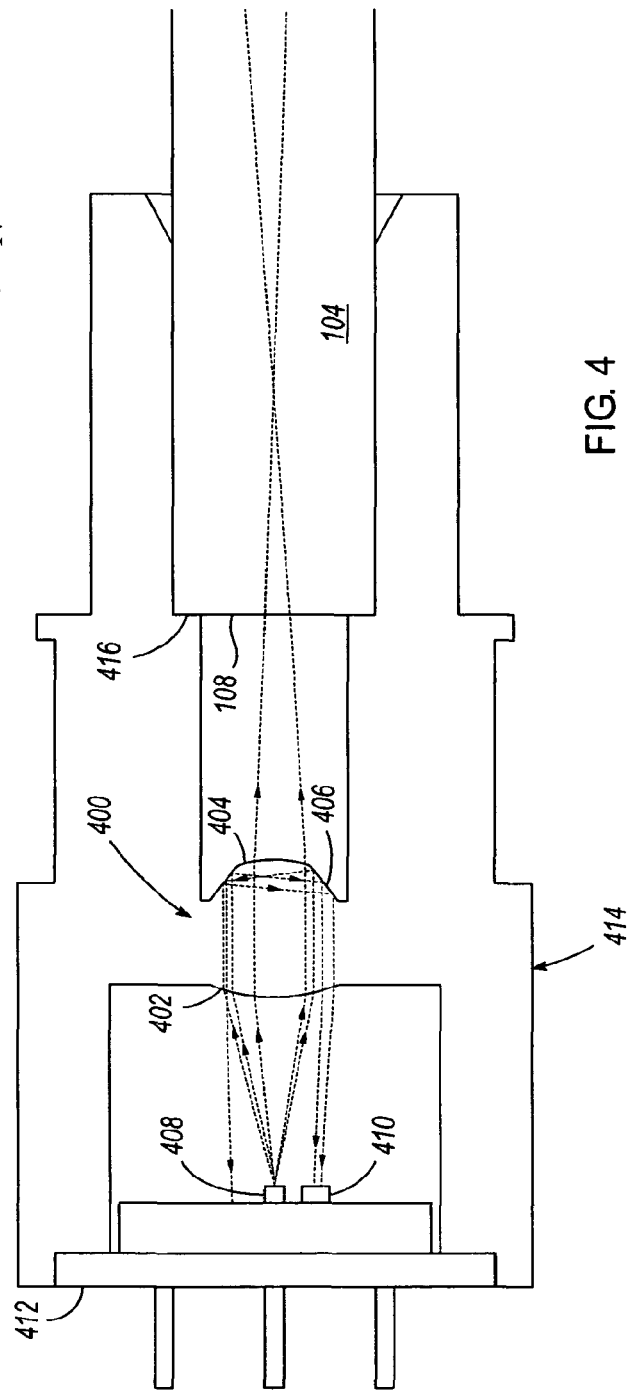
Figure 5:
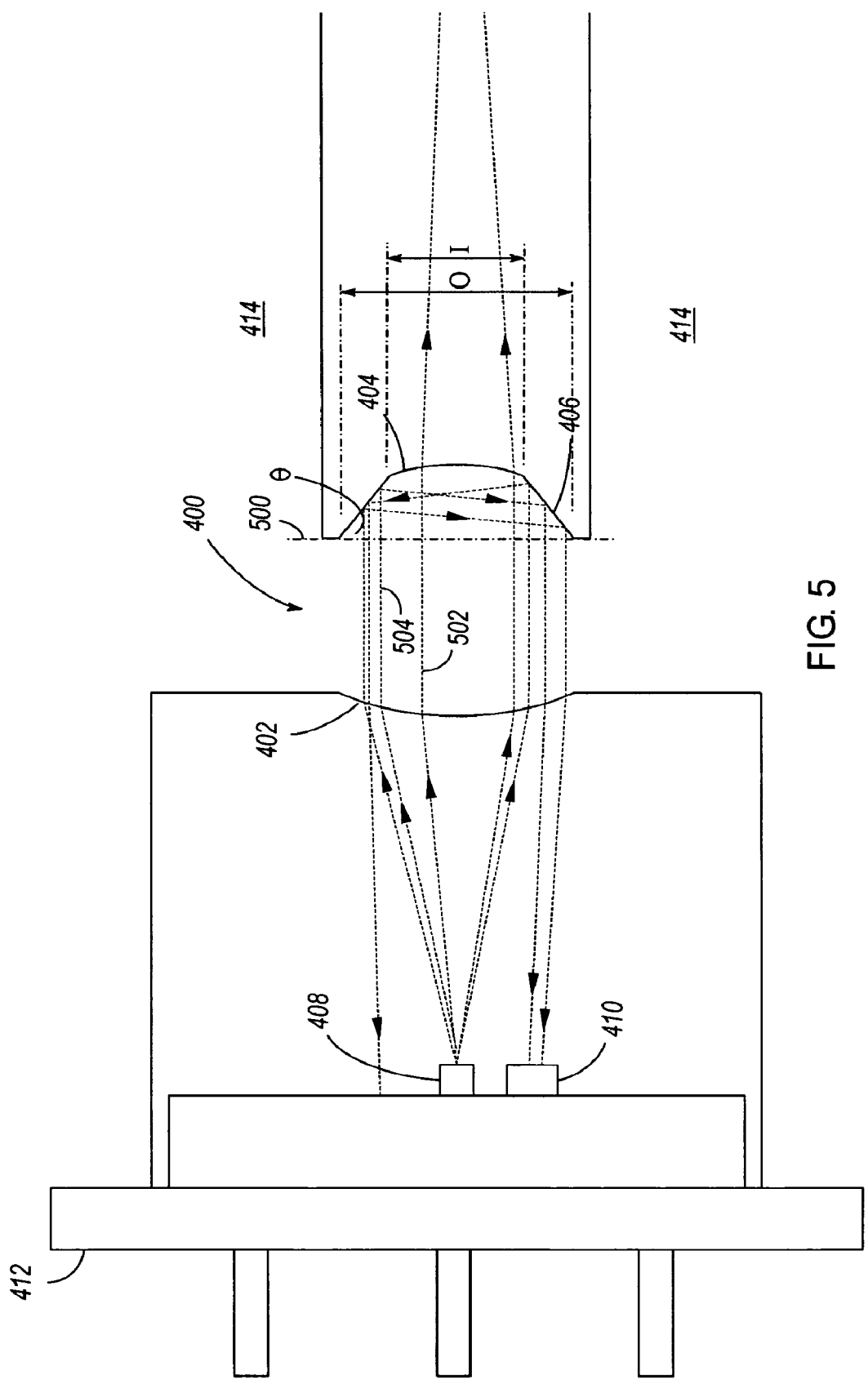

As shown in FIG. 4, the lens structure 400 may take the form of a monolithic polymer structure in which the object surface 402, image surface 404 and axicon mirror 406 are molded (e.g., injection molded). In addition to the various optical surfaces 402, 404, 406, the lens structure 400 may comprise (or be integrated with) a housing 414. In one embodiment, the housing 414 may be (or comprise) a TO can. In this manner, the lens structure's optical surfaces 402, 404, 406 and housing 414 may all be formed as a single molded part, thereby reducing the number of manufacturing steps and part count of the optical transmitter 102.

In addition to holding, or being integrated with, the lens structure 400, the housing 414 may comprise features (e.g., depressions, receptacles, brackets or couplers) to position the light source 408, the photodetector 410 and an optical fiber 104 with respect to the lens structure 400 and each other. For example, the housing 414 may comprise a receptacle with a stop 416 for receiving an optical fiber 104 and positioning it with respect to the image surface 404 of the lens structure 400. The housing 414 may also comprise a depression for mating with a TO can header 412 on which the light source 408 and photodetector 410 are mounted.

The lens structure 400, including its object surface 402, image surface 404, axicon mirror 406, and any housing 414 integrated therewith, may be manufactured, for example, by injection molding a polymer such as polyetherimide (PEI) in, for example, a mold cavity formed by a diamond turning process. One suitable polymer is Ultem®, an amorphous thermoplastic PEI resin distributed by General Electric Company. Ultem® exhibits a high transmission coefficient at 850 nm and 1300 nm wavelengths, making it a suitable material for use in optical receiver, transmitter, and transceiver modules. Ultem® has a high glass transition temperature, approximately 215° C., allowing for high temperature solder or other processing of modules (e.g., ultrasonic welding) during manufacturing. The lens structure 400 may also be manufactured using other materials having suitable optical properties (e.g., other polymers, or glass), by means of injection molding, polishing or other processes.

Figure 7:
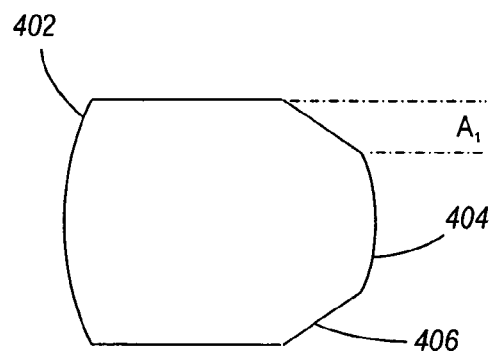
FIGS. 7 & 8 illustrate lens structures having axicon mirrors with different dimensions "A"
Figure 8:
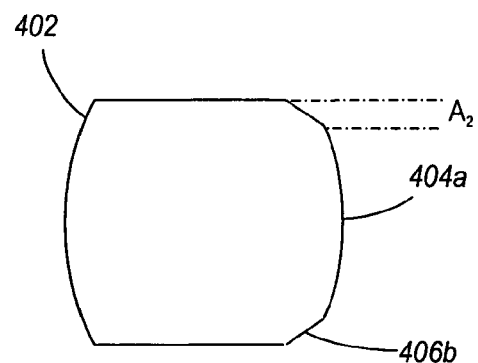
Figure 9:
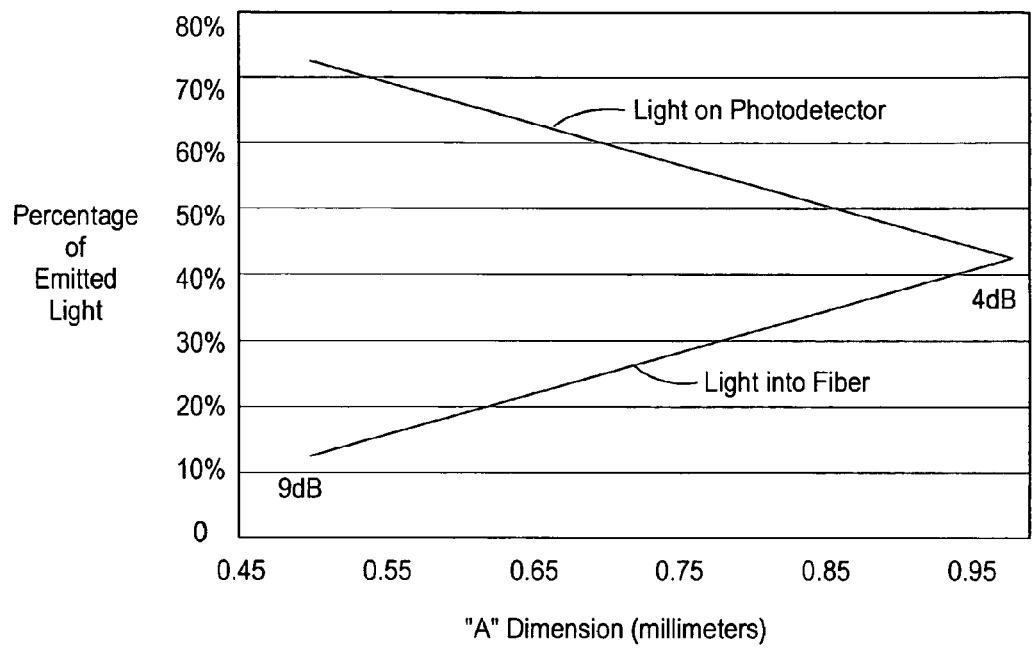
FIG. 9 illustrates how varying the dimension "A" of a lens structure's axicon mirror influences the degree of optical attenuation provided by the lens structure.
Figure 12:
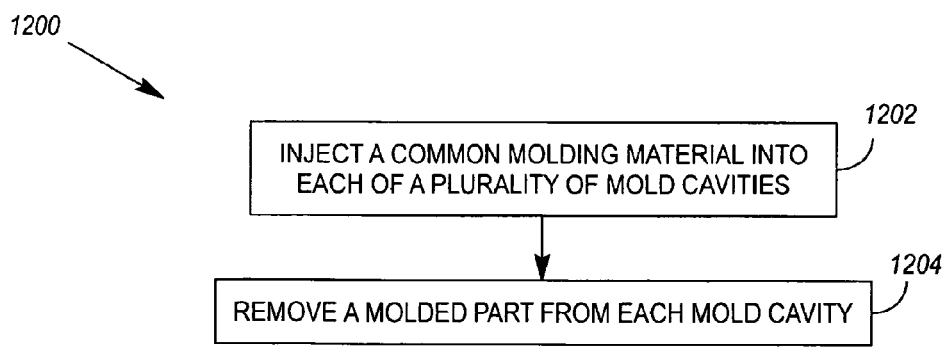
FIG. 12 illustrates a method for producing lens structures with different optical attenuation properties.

FIG. 12 illustrates a method 1200 for producing lens structures with different optical attenuation properties. The method 1200 comprises injecting 1202 a common molding material (e.g., a polymer) into each of a plurality of mold cavities. Each mold cavity defines a lens structure having an object surface, an image surface, and an axicon mirror. However, different mold cavities define different combinations of image surfaces and axicon mirrors, with different axicon mirrors sharing a common outer diameter and tilt angle, but having different inner diameters. FIGS. 7 & 8 illustrate two such combinations of image surface 404, 404a and axicon mirror 406, 406a. After injecting the polymer material into the mold cavities, a molded part may be removed 1204 from each cavity.

Although there are other ways to vary the attenuation provided by an axicon mirror 406 (e.g., by varying its tilt angle or outer diameter), varying the mirror's inner diameter provides a relatively simple and easy-to-implement variation.

In one embodiment of the method 1200, the common polymer material may be injected into a single mold, wherein different ones of the mold's cavities are configured to provide different combinations of image surfaces 404, 404a and axicon mirrors 406, 406a.

What is claimed is:

1. A lens structure, comprising:
   an object surface;
   an axicon mirror defined by an inner diameter, an outer diameter, and a tilt angle defined by a plane of the axicon mirror and the surface of the axicon mirror; and
   an image surface within the inner diameter of the axicon mirror.

2. The lens structure of claim 1, wherein the object and image surfaces are convex.

3. The lens structure of claim 1, wherein the tilt angle of the axicon mirror is optimized with respect to the object surface to provide total internal reflection of light rays incident on the axicon mirror.

4. The lens structure of claim 3, wherein the tilt angle of the axicon mirror is further optimized with respect to the object surface to provide light ray return paths that are asymmetrical to forward light ray paths.

5. The lens structure of claim 1, wherein the lens structure is a monolithic polymer structure in which the object surface, image surface and axicon mirror are molded.

6. The lens structure of claim 5, further comprising a housing, molded in said monolithic polymer structure.

7. The lens structure of claim 6, wherein the housing is a transistor outline (TO) can.

8. The lens structure of claim 5, wherein the polymer material comprises a polyetherimide.

\* \* \* \* \*